US012499983B2

(12) United States Patent
Strohbehn et al.

(10) Patent No.: US 12,499,983 B2
(45) Date of Patent: Dec. 16, 2025

(54) METHODS, SYSTEMS, AND APPARATUSES FOR DOSE OPTIMIZATION

(71) Applicants: The United States Government as Represented by the Department of Veterans Affairs, Washington, DC (US); The Regents of the University of Michigan, Ann Arbor, MI (US)

(72) Inventors: Garth William Strohbehn, Ann Arbor, MI (US); Philip Simon Boonstra, Ann Arbor, MI (US)

(73) Assignees: The United States Government as Represented by the Department of Veterans Affairs, Washington, DC (US); The Regents of the University of Michigan, Ann Arbor, MI (US)

( * ) Notice: Subject to any disclaimer, the term of this patent is extended or adjusted under 35 U.S.C. 154(b) by 111 days.

(21) Appl. No.: 18/370,603

(22) Filed: Sep. 20, 2023

(65) Prior Publication Data
US 2024/0096470 A1    Mar. 21, 2024

Related U.S. Application Data

(60) Provisional application No. 63/408,324, filed on Sep. 20, 2022.

(51) Int. Cl.
*G16H 20/10* (2018.01)

(52) U.S. Cl.
CPC .................. *G16H 20/10* (2018.01)

(58) Field of Classification Search
CPC ....................................... G16H 20/10
See application file for complete search history.

(56) References Cited

U.S. PATENT DOCUMENTS 11,754,575 B2 * 9/2023 Holland ............... C12Q 1/6851
702/19

OTHER PUBLICATIONS

Takahashi,Elsevier,2021,pp. 1-10.*
Mu,2021,Elsevier,pp. 1-14.*

* cited by examiner

*Primary Examiner* — Michael I Ezewoko
(74) *Attorney, Agent, or Firm* — Ballard Spahr LLP

(57) ABSTRACT

Methods, systems and apparatuses for dose optimization is disclosed. A predetermined threshold may be assigned to a medication. Dose-responses from each subject of a plurality of subjects may be collected and evaluated so that a determination may be made regarding whether a particular dose is equal to a true minimum dose with satisfactory efficacy value.

20 Claims, 4 Drawing Sheets

METHODS, SYSTEMS, AND APPARATUSES FOR DOSE OPTIMIZATION

CROSS-REFERENCE TO RELATED APPLICATION

This application claims the benefit of and priority to U.S. Provisional Patent Application No. 63/408,324, filed Sep. 20, 2022, the contents of which are hereby incorporated by reference herein in its entirety.

BACKGROUND

Scarcity pervades healthcare, particularly for drugs. While increased production of scarce drugs would generally be sought, this is unlikely to be rapid enough to address fast-moving, exponentially growing global pandemics, where demand for the scarce resource will continue to outpace supply. Efficient allocation of a drug or amount of a drug therefore becomes necessary to maximize the amount of benefit that can be generated from a limited supply.

SUMMARY

It is to be understood that both the following general description and the following detailed description are exemplary and explanatory only and are not restrictive. Methods, systems, and apparatuses for dose optimization related to the administration of a medication are described herein.

Disclosed herein is a method. The method may include determining a data set. The determination of the data set may be based on a dichotomous response to an administration of a first dose to each subject of a first plurality of subjects. The method may include determining that a characteristic of the first dose exceeds a threshold. The determination that the characteristic of the first dose exceeds the threshold may be based on the data set. The method may include determining a posterior probability that a characteristic of a second dose will meet the threshold. The determination that the posterior probability that the characteristic of the second dose will meet the threshold may be based on the characteristic of the first dose exceeding the threshold. The determination that the posterior probability that the characteristic of the second dose will meet the threshold may also be based on the data set. The method may include generating a dose administration protocol configured to assign the second dose to each subject of a second plurality of subjects. The generation of the dose administration protocol configured to assign the second dose to each subject of the second plurality of subjects may be based on the posterior probability that the characteristic of the second dose will meet the threshold.

A method is also disclosed herein. The method may include determining a data set. The determination of the data set may be based on a dichotomous response to an administration of a dose to each subject of a plurality of subjects. The method may include determining that a characteristic of the dose meets a threshold. The determination that the characteristic of the dose meets the threshold may be based on the data set. The method may include determining that the dose is equal to a minimum dose with satisfactory efficacy (MDSE) value. The determination that the dose is equal to the MDSE value may be based on the characteristic of the dose meeting the threshold. The method may include generating a dose administration protocol configured to further administer the dose. The generation of the dose administration protocol configured to further administer the dose may be based on the dose being equal to the MDSE value.

Additional advantages will be set forth, in part, in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, together with the description, serve to explain the principles of the methods, systems, and apparatuses described herein.

DETAILED DESCRIPTION

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented to achieve the methods described herein. Furthermore, a computer program product on a computer-readable storage medium (e.g., non-transitory) having processor-executable instructions (e.g., computer software) embodied in the storage medium may also be implemented to process any of the methods described herein. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the functions specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support a device or combinations of devices for performing the specified functions, combinations of steps for performing the specified functions, and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Clinical trials that may describe a dose-response relationship of a medication are typically performed prior to a confirmation of an efficacy of the medication. Based on a suspected dose-response relationship, a range of dose levels may be assessed in a clinical trial. The range of dose levels may each correspond to a predefined dosage level or total dose that may actually be in excess of the amount of dosage a subject (e.g., a person) would need in order to obtain the desired benefit from the medication (i.e., the medication may be overdosed, relative to the amount that the subject may need). In the same manner, the time period between the time doses are taken/administered (e.g., the predefined dosage interval) may be too short with regard to the actual amount of time a subject would need in order to obtain and/or maintain the desired benefit from the medication (i.e., the medication is administered too frequently, relative to the frequency that a person needs for a given dose quantum). Administering medication(s) to subjects at a dosage amount higher than necessary, more often than necessary, and/or too many times than necessary may generate negative externalities on two scales. On a global scale, over-administration may exacerbate the scarcity of medication that occurs in particular areas and/or during particular time periods (e.g., during a pandemic or sudden increase in a particular disease). On an individual level, over-administration of a medication may increase a subject's probability of succumbing to a negative effect while, simultaneously, not raising the probability of efficacy, thus worsening the individual subject's clinical outcome when compared to a lower dose.

Fractional dosing may be used to stretch scarce resources but is very commonly avoided due to an inherent risk posed to a subject (e.g., a patient, human patients), such as under-dosing, being assumed. Therefore, because of the fact that a more efficient and less wasteful efficacy level is never determined, vast subject-level overdosing is prevalent around the world, despite the scarcity of global access to medications. Another effect of over-dosing may have health implications in the form of preventable symptoms that may unnecessarily affect the subject.

Provided herein are methods, systems, and apparatuses for dose optimization related to the administration of a medication. Medication is often-times administered to subjects (e.g., patients, human patients) at a predefined dosage level, at predefined intervals, and/or at predefined total doses (e.g., a two-dose regimen, seven-dose regimen, etc.). The predefined dosage level or total doses may actually be in excess of the amount of dosage a subject would need in order to obtain the desired benefit from the medication. In the same manner, the time period between the time doses are taken (e.g., the predefined dosage interval) may be too short with regard to the actual amount of time a subject would need in order to obtain and/or maintain the desired benefit from the medication. Administering medication to subjects at a dosage amount (or dose interval or total number of doses) higher than necessary, more often than necessary, and/or too many times than necessary may be counterintuitive in consideration of the scarcity of medication in particular areas, on a global scale, and/or during particular time periods (e.g., during a pandemic or sudden increase in a particular disease). In other words, by administering subjects with more dosage of a medication than may be considered efficient, a provider of the medication may be preventing the administration of the medication to others. Furthermore, the over-dosing of the medication to subjects may present undesired results and preventable symptoms in the individual subject that may have been mitigated if the dosage (or dosage interval or total number of dosages) had been truly appropriate for its intended purpose. Therefore, it may be beneficial to determine a minimum dose of a medication with satisfactory efficacy (MDSE) value. The result being that the excess amount of medication above the determined minimum dose may be retained and optionally consolidated with other excess amounts of the medication for subsequent supply to an additional subject or subjects. For example, the MDSE value may be determined based on a plurality of diverse dose-response curves that may represent a plurality of dichotomous dose-responses (e.g., a positive or negative response) from each subject of a plurality of subjects.

Figure 1:
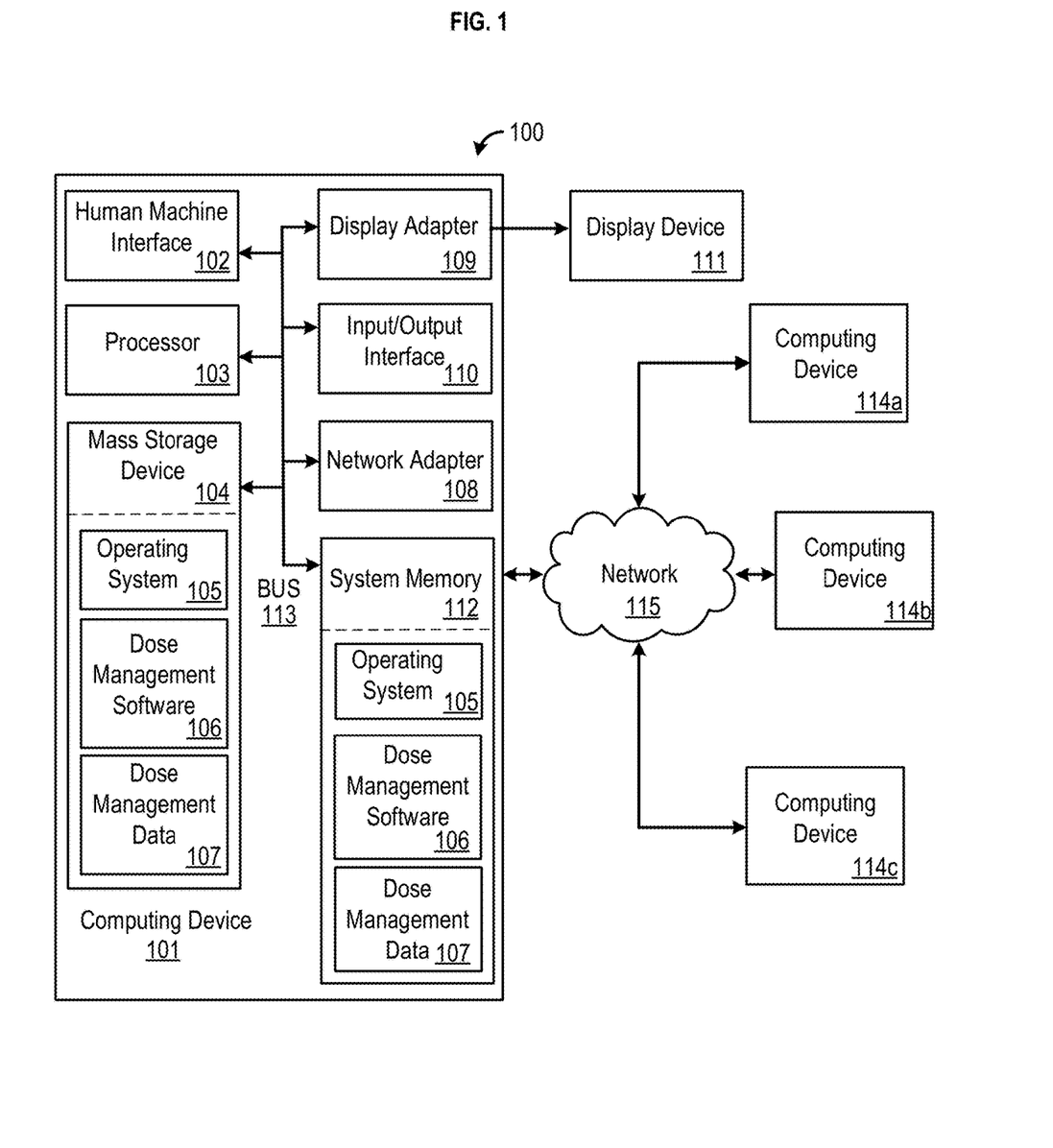
FIG. 1 shows an example system.

FIG. 1 shows an example system 100 for determining a dose (or dose interval or total number of doses) of a medication (e.g., a drug) that may considered to be satisfactorily efficacious with regard to a dosage amount (or dose interval or total number of doses) that may provide a subject (e.g., a patient, human patients) of a plurality of subjects with the desired benefit from the medication. Satisfactory efficacy associated with the dose (or dose interval or total number of doses) may also be based on a time period between the time doses are taken (e.g., a predefined dosage interval) and/or a number of doses (e.g., a predefined amount of doses determined to be necessary for the subject to achieve satisfactory efficacy associated with the dose). The example system 100 may be representative of a system for determining a dose-response outcome associated with the dose of the medication (or dose interval or total number of doses) that may be administered to the subject.

The administered dose of the medication (or dose interval or total number of doses) may vary based on the collection and evaluation of at least one data set. The example system 100 may collect and evaluate data sets from a plurality of groups of subjects. For example, the dose of the medication (or dose interval or total number of doses) may vary between different groups of the plurality of groups of subjects. For example, a first group of subjects may be administered with a first dose (or dose interval or total number of doses). Depending on the evaluation of the collected data set, and based on the first dose (or dose interval or total number of doses) administered to the first group of subjects, a second dose (or dose interval or total number of doses) may be administered to a second group of subjects. For example, the second dose (or second dose interval or second total number of doses) administered to the second group of subjects may be a lower or a higher dose than the first dose (or dose interval or total number of doses) administered to the first group of subjects. The data set may be a plurality of data points from each of the subjects of the different groups of the plurality of groups of subjects, for example. For example, a response curve may be formed from the plurality of data points. The dose-response outcome may represent an upper limit of the plurality of data points, which may correspond to an upper asymptote of the response curve, for example. For example, each data point of the plurality of data points may represent one of a dichotomous response (e.g., a positive or negative test response) to an administration of the dose (or dose interval or total number of doses) of the medication to the one or more subjects. For example, the dose-response outcome may be evaluated in comparison to a threshold. The dose-response outcome may be a mean value determined based on a plurality of dichotomous responses. The threshold may be a predetermined value that may be associated with a dose (or dose interval or total number of doses) of the medication that may be considered to be satisfactorily efficacious with regard to the dosage amount that may provide the subject with the desired benefit from the medication. In the example where the dose-response outcome may be determined to be equal to the threshold, the dose-response outcome may be indicative of the MDSE value. Although only certain devices and/or components are shown, the system 100 may comprise a variety of other devices and/or components that support a wide variety of functions, such as network and/or communication functions. Those skilled in the art will appreciate that the present systems and methods may be used in various types of networks and systems that employ both digital and analog equipment.

The system 100 may include a computing device 101. The computing device 101 may comprise one or more processors (e.g., at least one processor and/or a plurality of processors) or processing units 103, a system memory 112, and a system bus 113 that couples various system components of the computing device 101, including the processor 103, to the system memory 112. In the case of multiple processing units 103, the system may utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus (USB) and the like.

The system bus 113 may also be implemented over a wired or wireless network connection to each of the subsystems, including the processor 103, a mass storage device 104, an operating system 105, dose management software 106, dose management data 107, a network adapter 108, an Input/Output (I/O) interface 110, a display adapter 109, a display device 111, and a human machine interface 102. It is understood that the system bus 113 and each of the aforementioned subsystems may be contained within one or more computing devices 114A-C at physically separate locations, connected through buses of this form; in effect implementing a fully distributed system.

The computing device 101 may operate on and/or comprise a variety of computer-readable media (e.g., non-transitory computer-readable media). Computer-readable media may be any available media that is accessible by the computing device 101 and comprises both volatile and non-volatile media and removable and non-removable media. The system memory 112 may comprise computer-readable media in the form of volatile memory and removable and non-removable media. The system memory 112 may comprise computer-readable media in the form of volatile memory, such as random access memory (RAM), and/or non-volatile memory, such as read only memory (ROM). The system memory 112 typically contains data and/or program modules, such as an operating system 105 and dose management data software 106 that are accessible to and/or are operated on by the one or more processors 103.

The dose management software 106 may be configured to determine a dose-response model. For example, the dose-response model may be used as a basis by which the dose-response outcome that may be associated with the MDSE value may be determined. For example, the dose-response model may be an unknown dose-response function represented as:

$$\xi_t = Pr(R=1|t), t=1, \ldots, T$$

where $\xi_t$ may be a probability of a dose-response outcome in the instance wherein a first dose level t is used. $Pr(R=1|t)$ may be representative of a probability expression wherein R may be a dichotomous response collected from each of the subjects of the plurality of subjects. For example, the collection of the dichotomous response from each of the subjects may be received within a specific time period. For example, while the dose-response model may determine the probability of the dose-response ($\xi_t$) wherein a plurality of dose levels (T) may be assessed from 1 to T, the dose levels (T) may also be assessed from 0 to T. The imposition of an assumption that a true dose-response curve may be non-decreasing ($\xi_{t-1} \leq \xi_t$) may result in improved statistical efficiency without sacrificing performance. For example, the statistical efficiency may be improved by allowing for the amount of subjects to be tested and/or the amount of time the subjects are tested to be faster and/or smaller than it would generally have to be in a circumstance wherein the dose-response model may not be applied.

The dose management software 106 may also be configured to achieve monotonicity in the dose-response model. For example, monotonicity may be achieved by pre-specifying a parametric dose-response model (e.g., a logistically regressive dose-response model). For example, monotonicity in the dose-response model may also be achieved by equipping a non-parametric dose-response model with a Bayesian prior that may enforce monotonicity. In the example where the non-parametric dose-response model is equipped with the Bayesian prior, pre-specification of a functional relationship between each determined probability of the dose-response ($\xi_t$) may be avoided. The avoidance of the pre-specification of the functional relationship between each determined probability of the dose-response ($\xi$t) may provide for a more streamlined and efficient method of receiving results associated with the dose-response model, for example. The Bayesian prior may implement a horseshoe (HS) isotonic probability vector distribution and may be a length (T+1) associated with a set of non-negative parameters (e.g., weights—$\alpha_1$, $\alpha_2$, . . . , $\alpha_T$, $\alpha_{T+1}$) that may correspond to the response probabilities for each dose level. For example, the set of non-negative parameters may correspond to the response probabilities for each dose level at a one-to-one (e.g., a 1:1) ratio. For example, the non-parametric dose-response model equipped with the Bayesian prior may be a transformation represented as:

$$\xi_t = \Sigma_{j=1,\ldots,t}\alpha_j / \Sigma_{j=1,\ldots,T+1}\alpha_j$$

where $\xi_t$ may be a function of a summation of a first weight associated with the dose level (t) divided by a total sum of the weights of the plurality of dose levels (T). For example, the transformation may result in response probabilities being non-decreasing based on the weights being non-negative. The Bayesian prior applied to each parameter may be the positive half of the HS or a horseshoe-plus (HSPl) distribution, for example. For example, each of the formulations that may implement either the HS or the HSPl may enable an estimation of the monotonic dose-response curves without imposing any constraints on a shape of the dose-response curve.

Furthermore, the dose management software 106 may be configured to collect and evaluate dose-responses so that the dose-response outcome associated with the MDSE value may be determined. For example, the dose-response outcome associated with the MDSE value may be configured to retain 100 k % of a dose level's (T's) efficacy, where k may be a pre-specified design parameter. For example, the design parameter may reflect a degree to which a relative efficacy may be deemed satisfactory. The design parameter may be deemed satisfactory in the instance where a subject may receive an effective reduced dose of a medication (or dose interval or total number of doses), for example. For example, the effective dose of the medication (or dose interval or total number of doses) may be greater than, or equal to, 80% effectiveness associated with the dosage amount that may be adequate to provide the subject of the plurality of subjects with the desired benefit from the medication. For example, the effective dose of the medication (or dose interval or total number of doses) may be greater than, or equal to, any percentage (e.g., 90%, 95%, or 75%). The dose (or dose interval or total number of doses) may retain its effectiveness (e.g., by use by a patient, human patient) by consuming the dose (or dose interval or total number of doses) in any way, such as orally or nasally. For example, k may be assigned a value of 0.8. Symbolically, the MDSE value may be represented as:

$$\min\{t:\xi_t \geq k \cdot \xi_T\}$$

where t may be a dose level of a plurality of dose levels and T may be a first dose level of the plurality of dose levels.

The dose management software 106 may implement a method or a process so that a de-escalation design may be evaluated. As an example, the dose-model may be a de-escalation design. For example, dose-response outcome(s) that may be resultant from the administration of the dose level (t) from either an individual subject or a plurality of subjects may be collected and evaluated based on the method or process of the de-escalation design.

A posterior probability of a current dose level (t) being the true MDSE value may be determined. For example, because the Bayesian prior may assume that the dose-response outcome(s) may be non-decreasing, data associated with the dose-response outcome(s) may be borrowed across a plurality of dose levels. As an example, an unsuccessful dose-response outcome for a second-lowest dose level of the plurality of dose levels may tend to the probability of the dose-response outcome being the true MDSE value for both the second-lowest and lowest dose levels of the plurality of dose levels. For example, based on the dose-response dose level (t), a second subject(s) is assigned to a second dose level. The second dose level may be a lower dose level than the immediately preceding dose level, for example. For example, the administration of varying dose levels to each of the subjects of the plurality of subjects may continue until a stopping rule may be encountered. For example, the stopping rule may be an indication that the dose-response outcome associated with the MDSE value has been identified. For example, the stopping rule may be an indication that the current dose-response outcome is equal to the threshold.

For example, a first method or process may assign a subsequent subject and/or a subsequent group of subjects to the dose level with a highest posterior probability of being the MDSE value. For example, the assignment of a dose level with the highest posterior probability of being the MDSE value may be based on the data associated with the dose-response outcome(s). For example, a second method or process may assign the subsequent subject and/or the subsequent group of subjects to a smallest dose level (t) with the posterior probability exceeding a mean posterior probability across all administered dose levels that a dose response is received for. For example, the sum of the posterior probabilities may equal one (e.g., "1"), so that the mean posterior probability may equal 1/T. For example, the second method or process may be represented as:

$$\min\{t:pt(n)>1/T\}.$$

For example, a third method or process may identify a dose level most likely to be the MDSE value, similar to the functionality of the first method or process. For example, the dose level most likely to be the MDSE value, or one of the two dose levels immediately below the dose level that is most likely to be the MDSE value may be administered to the subsequent subject and/or the subsequent group of subjects. As an example, a variant of the third method or process may update the posterior probability after each dose response. For example, another variant of the third method or process may update the posterior probability after a portion (e.g., ¼, ⅓, ⅖, ½ or any other amount less than 1) of a planned number of dose-responses from a particular number or percentage of subjects has been determined.

For example, a fourth method or process may assign the subsequent subject and/or the subsequent group of subjects to the dose level without a basis reliant upon the posterior probabilities associated with varying dose levels administered to varying cohorts of subjects. For example, any other method or process may be implemented to identify a dose level that may equal the MDSE value, and such methods or processes are not limited to the aforementioned methods or processes.

The computing device 101 may also comprise other removable/non-removable, volatile/non-volatile computer storage media. By way of example, the mass storage device 104 may provide non-volatile storage of computer code, computer readable (e.g., processor-executable) instructions, data structures, program modules, and other data for the computing device 101. For example, the mass storage device 104 may be a hard disk, a removable magnetic disk, a removable optical disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 104, including by way of example, the operating system 105, dose management software 106, and dose management data 107. Dose management data 107 may include each data response from each subject of the plurality of subjects. The dose management data 107 may also include the threshold indicative of the true MDSE value. The dose management data 107 may further include an identifier for each subject and/or each group of subjects as well as for a total number of doses each subject is administered. The dose management data 107 may also include the dichotomous response from each of the subjects associated with the administered dose as well as the dose-response outcome. For example, the threshold may be predetermined based on an acceptable efficacy value associated with a particular medication.

The display device 111 may be communicatively connected to the system bus 113 via an interface, such as the display adapter 109. It is contemplated that the computing device 101 may have more than one display adapter 109 and the computing device 101 may have more than one display device 111. For example, a display device 111 may be a monitor, an LCD (Liquid Crystal Display), light emitting diode (LED) display, smart glass, or a projector. In addition to the display device 111, other output peripheral devices may comprise components, such as speakers (not shown) and a printer (not shown) which may be connected to the computing device 101 via the Input/Output interface 110. Any step and/or result of the methods may be output in any form to an output device. Such output may be any form of visual representation, including, but not limited to, textual, graphical, animation, audio, tactile, and the like. The display device 111 and the computing device 101 may be part of one device, or separate devices.

Logical connections between the computing device 101 and any of the remote computing devices 114-C, may be made via the network 115, such as a local area network (LAN) and/or a general wide area network (WAN). Such network connections may be through a network adapter 108. The network adapter 108 may be implemented in both wired and wireless environments. Such networking environments are conventional and commonplace in dwellings, offices, enterprise-wide computer networks, intranets, and the Internet.

For purposes of illustration, application programs and other executable program components, such as the operating system 105 are illustrated herein as discrete blocks, although it is recognized that such programs and components reside at various times in different storage components of the computing device 101, and are executed by the data processor(s) of the computing device 101. An implementation of the dose management software 106 and/or the dose management data 107 may be stored on or transmitted across some form of computer-readable media. Any of the disclosed methods may be performed by computer-readable, processor-executable instructions embodied on computer-readable media. Further, any of the components or functions of the computing device 102 may equally be a part of and implemented in any one or each of the computing devices 114A-C.

Figure 2:
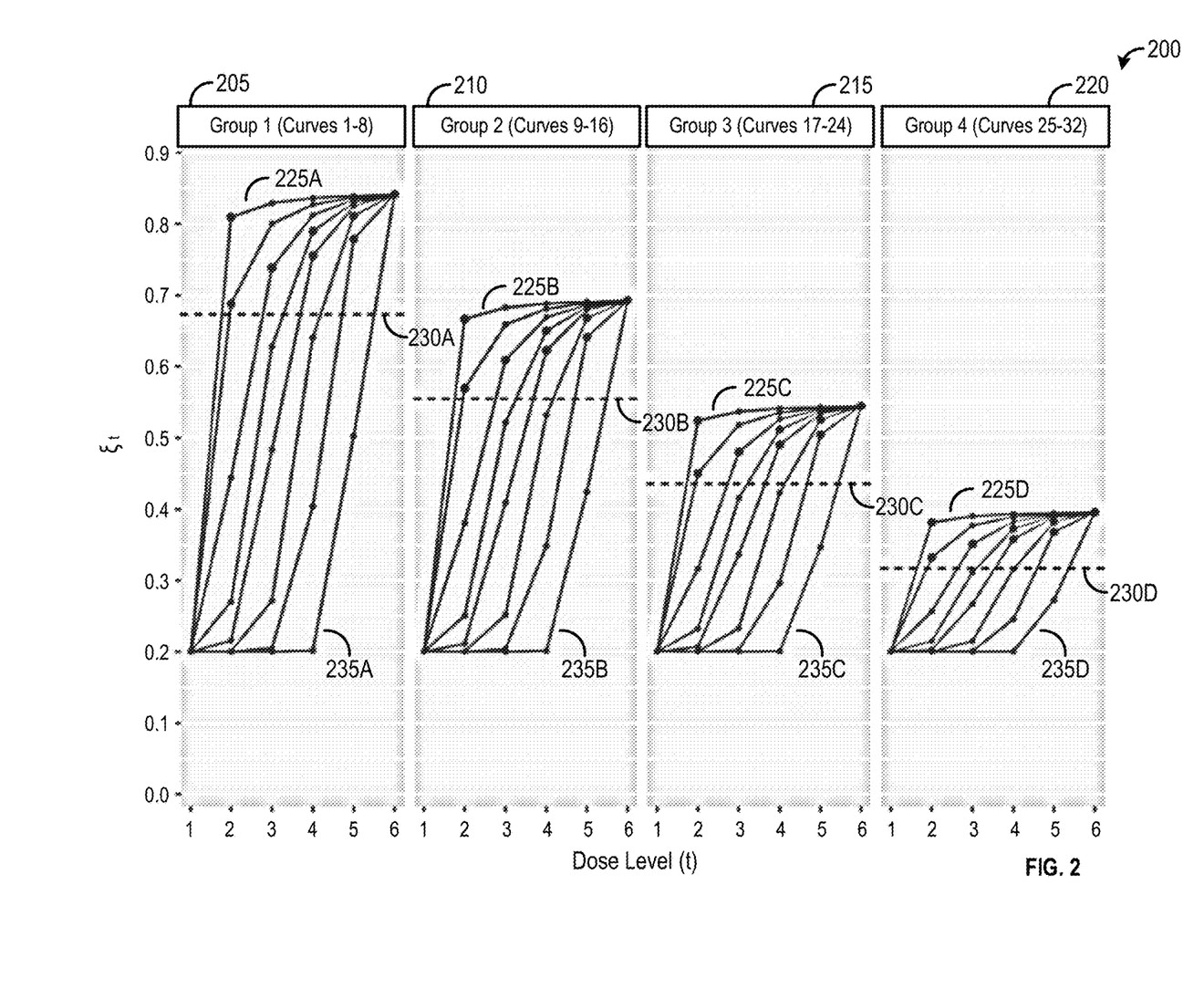
FIG. 2 shows an example graphical recording.

FIG. 2 shows an example graphical representation 200 of a plurality of dose-response curves represented by dose-response curve group(s) 205-220. Each of the dose-response curves of the dose-response curve groups 205-220 may represent an ideal dose-response to a particular medication. For example, each of the dose-response curves in each of the dose-response curve groups 205-220 may represent medications that are different from one another. For example, each of the dose-response curve groups 205-220 may be formed from eight ("8") dose-response curves. For example, each of the dose-response curves of the plurality of dose-response curve group(s) 205-220 may be governed by parameterizations of a four-parameter Hill equation. For example, the four-parameter Hill equation may be determined by:

$$Pr(R=1|X) = a + \frac{(b-a)}{\left[1 + \left(\frac{c}{X}\right)^d\right]}$$

where Pr(R=1|X) may be a dose-response probability, R may be a dichotomous response from each subject of a first plurality of subjects, X may be a value that may represent a concentration of a dose (or dose interval or total number of doses) of a drug, a (e.g., 235A-235D) may be a minimum asymptote for the probability of response at drug dose 0 (i.e., the likelihood of the 'response' occurring spontaneously), b (225A-225D) may be an upper asymptote for the probability of response to an infinitely high dose of drug, c (230A-230D) may be an average of a and b, and d may be a rate at which efficacy may increase (i.e., the slope).

For example, the upper asymptote 225A-225D of the dose-response curve may be indicative of a value of absolute efficacy of a dose of a medication (or dose interval or total number of doses), for example. For example, the absolute efficacy may be indicative of a value that may provide a subject with 100% value of the medication rather than a dose of the medication (or dose interval or total number of doses) that surpasses 100% value or the MDSE value that provides a satisfactorily efficacious benefit to the subject. For example, the average of the highest and the lowest probability of the dichotomous response being equal to the threshold (e.g., "c") may provide an indication of what may be a reasonable threshold. For example, the threshold may be a predetermined value that may be associated with a dose of the medication (or dose interval or total number of doses) that may be considered to be satisfactorily efficacious with regard to the dosage amount (or dose interval or total number of doses) that may provide the subject of the plurality of subjects with a minimum benefit expected from the medication. For example, the dose of the medication (or dose interval or total number of doses) that may be considered to be satisfactorily efficacious with regard to the dosage amount (or dose interval or total number of doses) may be less than the value of absolute efficacy of the same medication.

For example, dose-response curve group 205 may represent a as having an approximate value of 0.2, b as having an approximate value of 0.85, and c as having an approximate value of 0.7, while d may vary from 1-20. Each dose-response curve group 210-220 may similarly represent a as having an approximate value of 0.2, and c as having an approximate value of 0.7, while d may vary from 1-20, for example. Dose-response curve group 210 may represent b as having an approximate value of 0.70, for example. Dose-response curve group 215 may represent b as having an approximate value of 0.55, for example. Dose-response curve group 220 may represent b as having an approximate value of 0.5, for example. It is understood that each of the stated values for a-d may be approximately equivalent to any value, and that the aforementioned values only serve as non-limiting examples.

Figure 3:
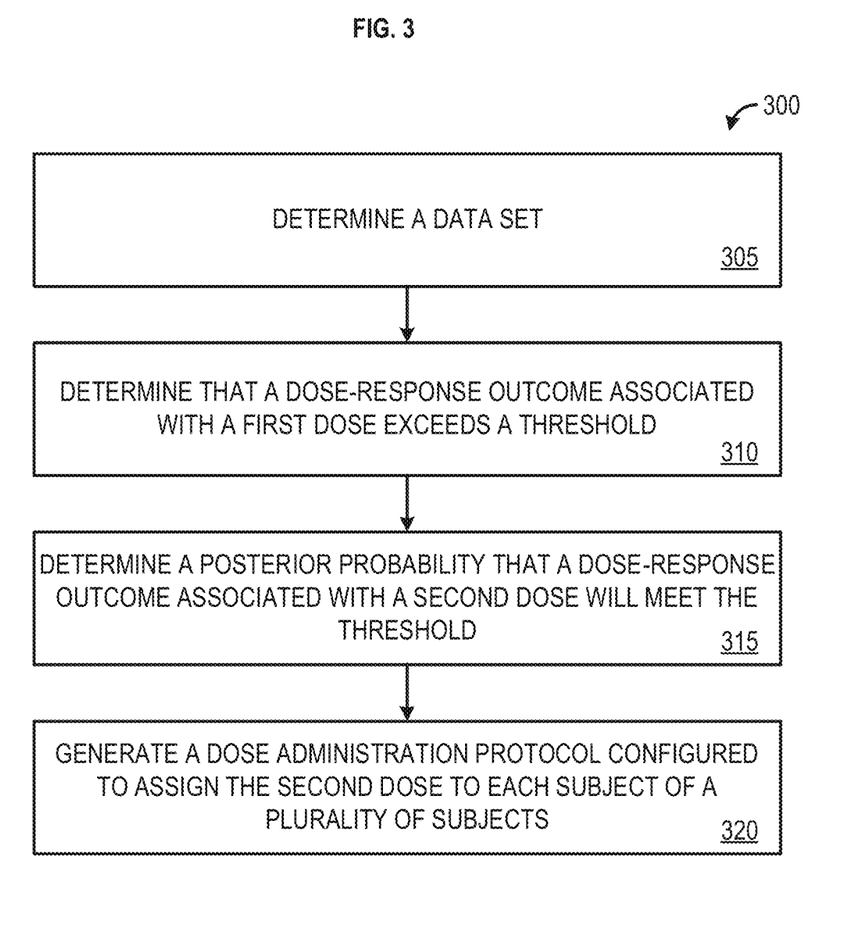
FIG. 3 shows a flowchart of an example method.

FIG. 3 shows a flowchart of an example method 300 for the optimization of a dose of a medication (e.g., a drug) that may be considered to be satisfactorily efficacious with regard to a dosage amount that may provide a subject (e.g., a patient, human patients) of a plurality of subjects with the desired benefit from the medication. Satisfactory efficacy associated with the dose (or dose interval or total number of doses) may also be based on a time period between the time doses are taken (e.g., a predefined dosage interval) and/or a total number of doses (e.g., a predefined amount of doses determined to be necessary for the subject to achieve satisfactory efficacy associated with the dose). For example, the satisfactory efficacy associated with the dose (or dose interval or total number of doses) may be the minimum dose concentration value (e.g., 80%, 70%, 60%, or any other value between 1% and 99%) that may provide the subject with the desired benefit of the medication. The method 300 may be performed by the computing device 101 and/or any of the computing devices 114A-114C.

At step 305, a data set may be determined. For example, the data set may be determined by the computing device 101 (e.g., by the dose de-escalation software 106 of the computing device 101). For example, the data set may be a plurality of data points from each of the subjects in a group of subjects of the plurality of groups of subjects. For example, each data point of the plurality of data points may represent one of a dichotomous response (e.g., either 1) a positive or 2) a null response) to an administration of the dose of the medication (or dose interval or total number of doses) to the first plurality of subjects or the plurality of groups of subjects. The dichotomous response may indicate the efficacy level of the medication with respect to a particular subject. For example, a positive response to the administration of the dose of the medication (or dose interval or total number of doses) may indicate that the dose (or dose interval or total number of doses) had an efficacious effect on the subject while a negative response to the administration of the dose of the medication (or dose interval or total number of doses) may indicate that the dose (or dose interval or total number of doses) did not have an efficacious effect on the subject. The first plurality of subjects may be a participating group of a cohort of a plurality of participating groups, for example. The first dose (or dose interval or total number of doses) of the medication may be a dose (or dose interval or total number of doses) closest to a controlled (e.g., baseline concentration) dose. For example, the baseline concentration may be the current dosage level, dosage interval, and/or number of doses being prescribed of the medication. For example, the first dose (or dose interval or total number of doses) of the medication may be lower than the controlled dose (or controlled dose interval or controlled total number of doses) of the medication.

At step 310, a determination may be made regarding whether a dose-response outcome associated with the first dose (or dose interval or total number of doses) exceeds a threshold. For example, the determination may be made by the computing device 101 (e.g., by the dose de-escalation software 106 of the computing device 101). For example, the dose-response outcome may be a percentage of positive responses based on the number of subjects in the group of subjects that may form a dose-response curve. An upper asymptote of the dose-response curve that may be equal to the upper asymptote 225A-225D may be indicative of a value of absolute efficacy of the first dose of the medication (or dose interval or total number of doses), for example. For example, the absolute efficacy may be indicative of a value that may provide a subject with 100% value of the medication rather than a dose of the medication (or dose interval or total number of doses) that surpasses 100% value or the MDSE value that provides a satisfactorily efficacious benefit to the subject. For example, the determination of whether the dose-response outcome associated with the first dose (or dose interval or total number of doses) exceeds the threshold may be based on the data set. The threshold may be a predetermined value that may be associated with a dose of the medication (or dose interval or total number of doses) that may be considered to be satisfactorily efficacious with regard to the dosage amount (or dose interval or total number of doses) that may provide the subject of the plurality of subjects with a minimum benefit expected from the medication. For example, the dose of the medication (or dose interval or total number of doses) that may be considered to be satisfactorily efficacious with regard to the dosage amount (or dose interval or total number of doses) may be less than the value of absolute efficacy of the same medication.

At step 315, a determination may be made regarding whether a posterior probability of a dose-response outcome associated with a second dose (or second dose interval or second total number of doses) of the medication will meet the threshold. The second dose (or second dose interval or second total number of doses) may be assigned based on a dose (or dose interval or total number of doses) that may be lower than the prior dose (e.g., the first dose) while retaining a probability that the second dose (or second dose interval or second total number of doses) will at least meet the threshold. For example, the determination may be made by the computing device 101 (e.g., by the dose de-escalation software 106 of the computing device 101). For example, the determination of the posterior probability with regard to whether the dose-response outcome associated with the second dose (or second dose interval or second total number of doses) may meet the threshold may be based on the dose-response outcome associated with the first dose (or dose interval or total number of doses) exceeding the threshold. The posterior probability may be determined for each dose (or dose interval or total number of doses) administered to each group of the one or more participating groups, for example.

For example, the determination of the posterior probability that the dose-response outcome associated with the second dose (or the second dose interval or the second total number of doses) will meet the threshold may comprise a determination of the second dose level (or the second dose interval or the second total number of doses) for the medication. For example, the dose-response outcome associated with the second dose (or second dose interval or second total number of doses) may be associated with a highest posterior probability of the second dose (or second dose interval or second total number of doses) meeting the threshold.

For example, determining the posterior probability that the dose-response outcome associated with the second dose (or second dose interval or second total number of doses) will meet the threshold may comprise a determination that a mean posterior probability value associated with a plurality of dose-response outcomes may meet the threshold and a determination of the second dose (or second dose interval or second total number of doses). The determination that the mean posterior probability value associated with the plurality of dose-response outcomes may meet the threshold may be based on the plurality of dose-response outcomes associated with a particular dose (or dose interval or total number of doses), for example. The plurality of dose-response outcomes may be a collection of dose-response outcomes of multiple groups of subjects administered with the first dose (or dose interval or total number of doses), for example. For example, the plurality of dose-response outcomes may be the first dose (or dose interval or total number of doses) and the second dose (or second dose interval or second total number of doses), so that a third dose (or third dose interval or third total number of doses) may be determined. For example, the second dose (or second dose interval or second total number of doses) may be determined by a calculation based on the mean posterior probability of the dose-response outcomes associated with the first dose (or dose interval or total number of doses). For example, the third dose (or third dose interval or third total number of doses) may be determined by a calculation based on the mean posterior probability of the dose response outcomes associated with the first dose (or dose interval or total number of doses) and the second dose (or second dose interval or second total number of doses). The dose-response outcome associated with the second dose (or second dose interval or second total number of doses) may be associated with a lowest posterior probability of the second dose (or second dose interval or second total number of doses) exceeding the mean posterior probability value.

For example, determining the posterior probability that the dose-response outcome associated with the second dose (or second dose interval or second total number of doses) will meet the threshold may comprise a determination of the second dose (or second dose interval or second total number of doses) and a determination of the third dose (or third dose interval or third total number of doses). For example, the determination of the second dose (or second dose interval or second total number of doses) may be based on the data set. The third dose (or third dose interval or third total number of doses) may be lower than the second dose, for example. For example, the highest posterior probability of the dose-response outcome associated with the second dose (or second dose interval or second total number of doses) meeting the threshold may be updated. For example, the highest posterior probability of the dose-response outcome associated with the second dose (or second dose interval or second total number of doses) meeting the threshold may be updated based on the dichotomous response. For example, the dose-response outcome may comprise the dichotomous response. The dose-response outcome may be a mean of a plurality of dichotomous responses, for example. The highest posterior probability of the dose-response outcome associated with the second dose (or second dose interval or second total number of doses) meeting the threshold may be updated, for example, based on the dichotomous response of a portion (e.g., ¼, ⅓, ⅖, ½ or any other amount less than 1) of the first plurality of subjects.

At step 320, a dose administration protocol configured to assign the second dose (or second dose interval or second total number of doses) to each subject of a second plurality of subjects may be generated. For example, the dose administration protocol may be generated by the computing device 101 (e.g., by the dose de-escalation software 106 of the computing device 101). The dose administration protocol may be a program that may be implemented on the computing device 101 (e.g., by the dose de-escalation software 106 of the computing device 101), for example. The dose administration protocol may provide medication-specific administration instructions to a provider, for example. For example, the dose administration protocol that may be generated may be based on the posterior probability that the dose-response outcome associated with the second dose (or second dose interval or second total number of doses) will meet the threshold. For example, the generation of the dose administration protocol may comprise an assignment of the second dose to each subject of the second plurality of subjects. For example, the dose administration protocol may facilitate the administration of the second dose to each subject of the second plurality of subjects. The dose administration protocol may facilitate the administration of the second dose to each subject of the second plurality of subjects by providing each subject of the second plurality of subjects with instructions on how and/or when to receive the second dose, for example.

For example, if the second dose (or second dose interval or second total number of doses) is determined to not have met the threshold, the third dose (or third dose interval or third total number of doses) may be administered to each subject of a third plurality of subjects. The dose administration protocol may be configured to assign the third dose (or third dose interval or third total number of doses) to each subject of the third plurality of subjects, for example. For example, if the second dose (or second dose interval or second total number of doses) is determined to have a value that falls below the threshold, the third dose (or third dose interval or third total number of doses) may be higher than the second dose (or second dose interval or second total number of doses). If the first dose (or dose interval or total number of doses) is determined to have a value that falls below the threshold, the second dose (or second dose or second total number of doses) may be higher than the first dose (or dose interval or total number of doses), for example. In an example, the second dose may be determined to be an MDSE for a specific medication.

Figure 4:
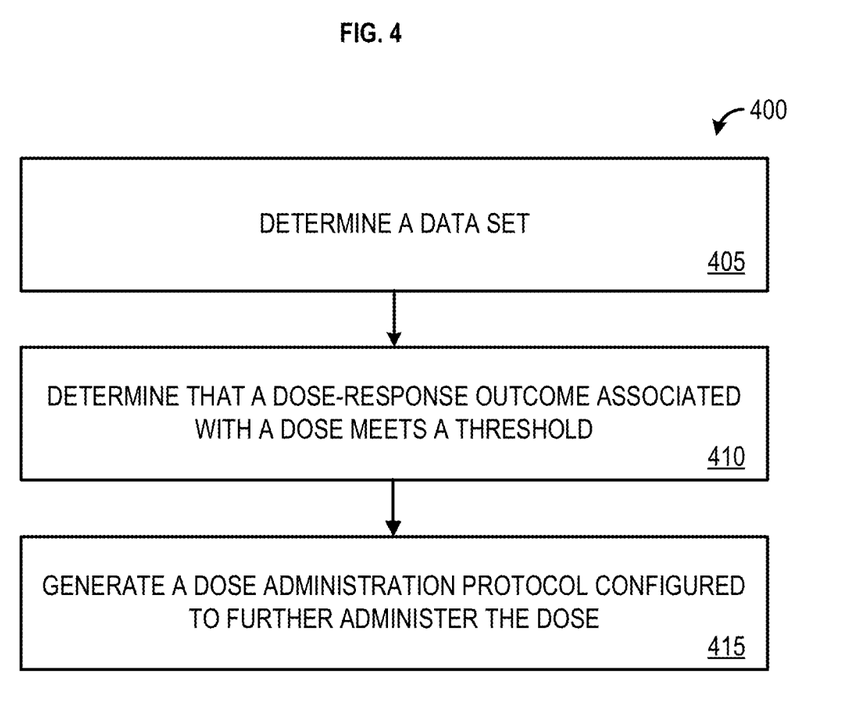
FIG. 4 shows a flowchart of an example method.

FIG. 4 shows a flowchart of an example method 400 for the optimization of a dose of a medication (e.g., a drug) that may be considered to be satisfactorily efficacious with regard to a dosage amount that may provide a subject (e.g., a patient, human patients) of a plurality of subjects with the desired benefit from the medication. Satisfactory efficacy associated with the dose may also be based on a time period between the time doses are taken (e.g., a predefined dosage interval) and/or a total number of doses (e.g., a predefined amount of doses determined to be necessary for the subject to achieve satisfactory efficacy associated with the dose). For example, the satisfactory efficacy associated with the dose may be the minimum dose concentration value (e.g., 80%, 70%, or 60%, or any other value between 1% and 99%) that may provide the subject with the desired benefit of the medication. The method 400 may be performed by the computing device 101 and/or any of the computing devices 114A-114C.

At step 405, a data set may be determined. For example, the data set may be determined by the computing device 101 (e.g., by the dose de-escalation software 106 of the computing device 101). For example, the data set may be a plurality of data points from each of the subjects in a group of subjects of the plurality of groups of subjects. For example, each data point of the plurality of data points may represent one of a dichotomous response (e.g., a positive or negative test response) to an administration of the dose of the medication (or dose interval or total number of doses) to a plurality of subjects of the plurality of groups of subjects. The dichotomous response may indicate the efficacy level of the medication with respect to a particular subject. For example, a positive response to the administration of the dose of the medication (or dose interval or total number of doses) may indicate that the dose had an efficacious effect on the subject while a positive response to the administration of the dose of the medication may indicate that the dose did not have an efficacious effect on the subject. The plurality of subjects may be a participating group of a cohort of a plurality of participating groups, for example. The dose of the medication may be a dose closest to a controlled (e.g., baseline concentration) dose. For example, the baseline concentration may be the current dosage level, dosage interval, and/or number of doses being prescribed of the medication. For example, the dose of the medication may be lower than the controlled dose of the medication.

At step 410, a determination may be made regarding whether a dose-response outcome associated with the dose meets a threshold. For example, the determination may be made by the computing device 101 (e.g., by the dose de-escalation software 106 of the computing device 101). For example, the dose-response outcome may be a percentage of positive responses based on the number of subjects in the group of subjects that may form a dose-response curve. An upper asymptote of the dose-response curve that may be equal to the upper asymptote 225A-225D may be indicative of a value of absolute efficacy of the first dose of the medication (or dose interval or total number of doses), for example. For example, the absolute efficacy may be indicative of a value that may provide a subject with 100% value of the medication rather than a dose of the medication that surpasses 100% value or the MDSE value that provides a satisfactorily efficacious benefit to the subject. For example, the determination of whether the dose-response outcome associated with the dose meeting the threshold may be based on the data set. The threshold may be a predetermined value that may be associated with a dose of the medication (or dose interval or total number of doses) that may be considered to be satisfactorily efficacious with regard to the dosage amount (or dose interval or total number of doses) that may provide the subject of the plurality of subjects a minimum benefit expected from the medication.

At step 415, a dose administration protocol configured to further administer the dose (or dose interval or total number of doses) to subsequent subjects may be generated. For example, the dose administration protocol may be generated by the computing device 101 (e.g., by the dose de-escalation software 106 of the computing device 101). The dose administration protocol may be a program that may be implemented on the computing device 101 (e.g., by the dose de-escalation software 106 of the computing device 101), for example. The dose administration protocol may provide medication-specific administration instructions to a provider, for example. For example, the generation of the dose administration protocol may be based on the dose-response outcome associated with the dose being equal to the MDSE value. The administration protocol may cause an administration of the dose to each subject of the plurality of subjects, for example. For example, the dose administration protocol may facilitate the administration of the dose to each subject of the plurality of subjects. The dose administration protocol may facilitate the administration of the dose to each subject of the plurality of subjects by providing each subject of the plurality of subjects with instructions on how and/or when to receive the dose, for example.

For example, if the dose (or dose interval or total number of doses) is determined to not have met the threshold, a second dose (or second dose interval or second total number of doses) may be administered to each subject of a second plurality of subjects. The dose administration protocol may be configured to assign the second dose (or second dose interval or second total number of doses) to each subject of the second plurality of subjects, for example. For example, if the dose (or dose interval or total number of doses) is determined to have a value that falls below the threshold, the second dose (or second dose interval or second total number of doses) may be higher than the dose (or dose interval or total number of doses). In an example, the second dose may be determined to be an MDSE for a specific medication.

While the methods and systems have been described in connection with preferred embodiments and specific examples, it is not intended that the scope be limited to the particular embodiments set forth, as the embodiments herein are intended in all respects to be illustrative rather than restrictive.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered with only a true scope and spirit being indicated by the following claims.

What is claimed is:
1. A method comprising:
   determining, based on a dichotomous response to an administration of a first dose to each subject of a first plurality of subjects, a data set;
   determining, based on the data set, that a dose-response outcome associated with the first dose exceeds a threshold;
   determining, based on the dose-response outcome associated with the first dose exceeding the threshold, a posterior probability that a dose-response outcome associated with a second dose will meet the threshold, comprising:
      determining, based on a plurality of doses, a mean posterior probability value that a mean dose-response outcome of the plurality of doses will meet the threshold, wherein the plurality of doses comprises at least the first dose; and determining, based on the mean posterior probability value, the second dose, wherein the dose-response outcome associated with the second dose is associated with a lowest posterior probability of the second dose exceeding the mean posterior probability value; and generating, based on the posterior probability that the dose-response outcome associated with the second dose will meet the threshold, a dose administration protocol configured to assign the second dose to each subject of a second plurality of subjects.

2. The method of claim 1, wherein the second dose is lower than the first dose.

3. The method of claim 1, wherein the threshold is a predetermined value indicative of a minimum dose with satisfactory efficacy of a drug associated with at least one of the first dose or the second dose.

4. The method of claim 1, wherein the data set comprises a plurality of data points associated with the dichotomous response from each subject of the first plurality of subjects.

5. The method of claim 4, wherein a response curve comprises each data point of the plurality of data points, wherein an upper asymptote of the response curve indicates a value of absolute efficacy of the first dose.

6. The method of claim 1, wherein determining the posterior probability that the dose-response outcome associated with the second dose will meet the threshold comprises:

updating, based on the dichotomous response from each subject of the first plurality of subjects, the highest posterior probability of the dose-response outcome associated with the second dose meeting the threshold; or updating, based on the dichotomous response of a fraction of the first plurality of subjects, the highest posterior probability of the dose-response outcome associated with the second dose meeting the threshold.

7. The method of claim 1, further comprising administering the second dose to each subject of the second plurality of subjects.

8. A method comprising:

determining, based on a dichotomous response to an administration of a first dose to each subject of a plurality of subjects, a data set;

determining, based on the data set, that a dose-response outcome associated with the first dose meets a threshold, comprising:

determining, based on a plurality of doses, a mean posterior probability value that a mean dose-response outcome of the plurality of doses will meet the threshold, wherein the plurality of doses comprises at least the first dose; and determining, based on the mean posterior probability value, the second dose, wherein the dose-response outcome associated with the second dose is associated with a lowest posterior probability of the second dose exceeding the mean posterior probability value; and generating, based on the dose-response outcome associated with the first dose meeting the threshold, a dose administration protocol configured to further administer the first dose or the second dose.

9. The method of claim 8, wherein the threshold is a predetermined value indicative of a minimum efficacy of the first dose.

10. The method of claim 8, wherein the threshold is equal to a minimum dose with satisfactory efficacy (MDSE) value.

11. The method of claim 8, wherein the data set comprises a plurality of data points associated with the dichotomous response from each subject of the plurality of subjects.

12. The method of claim 11, wherein a response curve comprises each data point of the plurality of data points, wherein an upper asymptote of the response curve indicates a value of absolute efficacy of the first dose.

13. The method of claim 8, wherein the dose is at least one of: a concentration value of the first dose, a dose interval, or a total number of doses.

14. The method of claim 8, further comprising administering the first dose to each subject of the plurality of subjects.

15. An apparatus comprising:

at least one processor of a plurality of processors; and a memory storing processor-executable instructions that, when executed by the at least one processor of the plurality of processors, cause the apparatus to:

determine, based on a dichotomous response to an administration of a first dose to each subject of a first plurality of subjects, a data set;

determine, based on the data set, that a dose-response outcome associated with the first dose exceeds a threshold;

determine, based on the dose-response outcome associated with the first dose exceeding the threshold and based on the data set, a posterior probability that a dose-response outcome associated with a second dose will meet the threshold, comprising:

determining, based on a plurality of doses, a mean posterior probability value that a mean dose-response outcome of the plurality of doses will meet the threshold, wherein the plurality of doses comprises at least the first dose; and determining, based on the mean posterior probability value, the second dose, wherein the dose-response outcome associated with the second dose is associated with a lowest posterior probability of the second dose exceeding the mean posterior probability value; and generate, based on the posterior probability that the dose-response outcome associated with the second dose will meet the threshold, a dose administration protocol configured to assign the second dose to each subject of a second plurality of subjects.

16. The apparatus of claim 15, wherein the second dose is lower than the first dose.

17. The apparatus of claim 15, wherein the threshold is a predetermined value indicative of a minimum dose with satisfactory efficacy of a drug associated with at least one of the first dose or the second dose.

18. The apparatus of claim 15, wherein the data set comprises a plurality of data points associated with the dichotomous response from each subject of the first plurality of subjects.

19. The apparatus of claim 15, wherein a response curve comprises each data point of the plurality of data points, wherein an upper asymptote of the response curve indicates a value of absolute efficacy of the first dose.

20. An apparatus comprising:

at least one processor of a plurality of processors; and a memory storing processor-executable instructions that, when executed by the at least one processor of the plurality of processors, cause the apparatus to:

determine, based on a dichotomous response to an administration of a first dose to each subject of a plurality of subjects, a data set;

determine, based on the data set, that a dose-response outcome associated with the first dose meets a threshold, comprising:

determining, based on a plurality of doses, a mean posterior probability value that a mean dose-response outcome of the plurality of doses will meet the threshold, wherein the plurality of doses comprises at least the first dose; and determining, based on the mean posterior probability value, the second dose, wherein the dose-response outcome associated with the second dose is associated with a lowest posterior probability of the second dose exceeding the mean posterior probability value; and generate, based on the dose-response outcome associated with the first dose meeting the threshold, a dose administration protocol configured to further administer the first dose or the second dose.

* * * * *